(12) United States Patent
Cui et al.

(10) Patent No.: US 12,185,088 B2
(45) Date of Patent: *Dec. 31, 2024

(54) SYSTEMS AND METHODS FOR MEASUREMENT SOLUTIONS FOR INTER-RAT MO FROM LTE MN IN EN-DC

(71) Applicant: APPLE INC., Cupertino, CA (US)

(72) Inventors: Jie Cui, San Jose, CA (US); Dawei Zhang, Saratoga, CA (US); Haitong Sun, Cupertino, CA (US); Hong He, San Jose, CA (US); Huaning Niu, San Jose, CA (US); Manasa Raghavan, Sunnyvale, CA (US); Qiming Li, Beijing (CN); Xiang Chen, Campbell, CA (US); Yang Tang, San Jose, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,516

(22) Filed: Sep. 28, 2023

(65) Prior Publication Data

US 2024/0022975 A1 Jan. 18, 2024

Related U.S. Application Data

(63) Continuation of application No. 17/593,685, filed as application No. PCT/CN2021/071580 on Jan. 13, 2021.

(51) Int. Cl.
*H04W 36/00* (2009.01)

(52) U.S. Cl.
CPC .. *H04W 36/0058* (2018.08); *H04W 36/00698* (2023.05)

(58) Field of Classification Search
None
See application file for complete search history.

(56) References Cited

U.S. PATENT DOCUMENTS

| | | |
|---|---|---|
| 2019/0182900 A1 | 6/2019 | Cui et al. |
| 2019/0239106 A1 | 8/2019 | Cui et al. |

(Continued)

FOREIGN PATENT DOCUMENTS

| | | |
|---|---|---|
| CN | 110831034 A | 2/2020 |
| WO | 2020033582 A1 | 2/2020 |

(Continued)

OTHER PUBLICATIONS

U.S. Appl. No. 17/593,685, Non-Final Office Action, Jan. 29, 2024, 15 pages.

(Continued)

*Primary Examiner* — Saumit Shah
(74) *Attorney, Agent, or Firm* — Dorsey & Whitney LLP

(57) ABSTRACT

Embodiments of the present disclosure enable a user equipment (UE) to performing inter-Radio Access Technology (RAT) measurements. The UE determines whether one or more inter-RAT measurement object (MO) is configured with or without a measurement gap (MG). When the one or more inter-RAT MO is on an NR serving component carrier (CC) with the MG, the UE performs an inter-RAT measurement on the NR serving CC based on whether the MG is (Continued)

fully overlapped or partially overlapped with synchronization signal blocks (SSBs) of a target MO of the one or more inter-RAT MO. When the one or more inter-RAT MO is on the NR serving CC without the MG, the UE performs the inter-RAT measurement on the NR serving CC based on whether a target SSB of the target MO is within or outside an active bandwidth part (BWP) of the NR serving CC.

9 Claims, 8 Drawing Sheets

(56) References Cited

U.S. PATENT DOCUMENTS

| | | | |
|---|---|---|---|
| 2019/0246306 A1 | 8/2019 | Yang et al. | |
| 2019/0274146 A1* | 9/2019 | Tang | H04W 24/10 |
| 2021/0014751 A1* | 1/2021 | Callender | H04W 72/0446 |
| 2023/0047684 A1 | 2/2023 | Hu | |
| 2023/0057211 A1 | 2/2023 | Min | |
| 2023/0156543 A1* | 5/2023 | Xie | H04W 36/0088 |
| | | | 370/332 |

FOREIGN PATENT DOCUMENTS

| | | |
|---|---|---|
| WO | 2020063559 A1 | 4/2020 |
| WO | 2020167814 A1 | 8/2020 |

OTHER PUBLICATIONS

Apple, "On CSSF for R15 EN-DC", R4-2014273, 3GPP TSG-RAN4 Meeting #97-e, Online, Agenda Item 4.7, Nov. 2-13, 2020, 6 pages.

Intel Corporation, Apple, "Motivation for introduction of a new R17 SI/WI on measurement gap enhancements", RP-200332, 3GPP TSG RAN Meeting #87e, Electronic Meeting, Agenda Item 15, Mar. 16-19, 2020, 5 pages.

PCT/CN2021/071580, International Search Report and Written Opinion, Oct. 14, 2021, 9 pages.

U.S. Appl. No. 17/593,685, Notice of Allowance, Jun. 13, 2024, 10 pages.

U.S. Appl. No. 17/593,685, Corrected Notice of Allowability, Jun. 21, 2024, 7 pages.

Moderator (Huawei, Hisilicon), "Email discussion summary for [97e][201] NR_NewRAT_RRM_Core", R4-2017271, 3GPP TSG-RAN WG4 Meeting# 97-e Electronic Meeting, Agenda Item 4.7, Nov. 2-13, 2020, 73 pages.

* cited by examiner

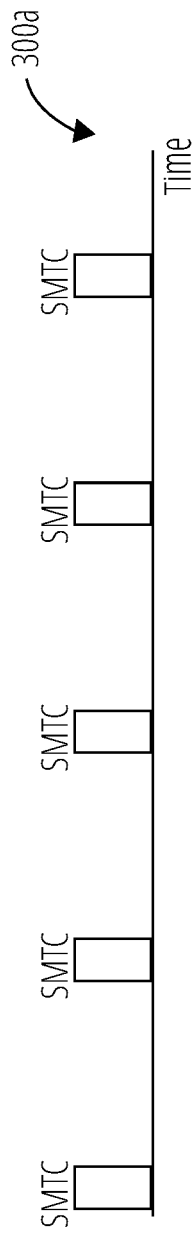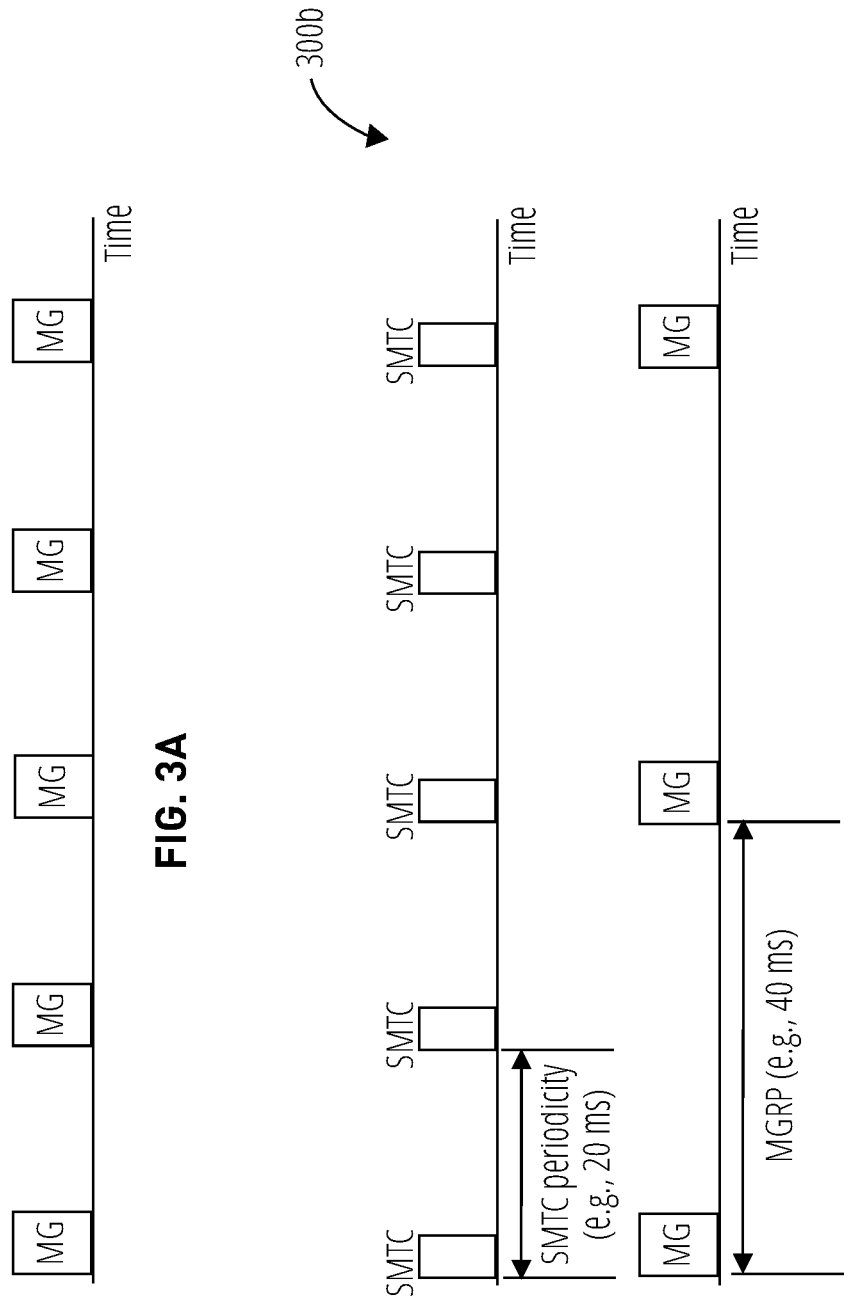
FIG. 3A
FIG. 3B

SYSTEMS AND METHODS FOR MEASUREMENT SOLUTIONS FOR INTER-RAT MO FROM LTE MN IN EN-DC

TECHNICAL FIELD

This application relates generally to wireless communication systems, including performing inter-Radio Access Technology (RAT) measurements.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network, such as an Evolved Packet Core (EPC). Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3A illustrates a fully overlapping case and FIG. 3B illustrates a partially overlapping case in accordance with certain embodiments.

DETAILED DESCRIPTION

Figure 1:
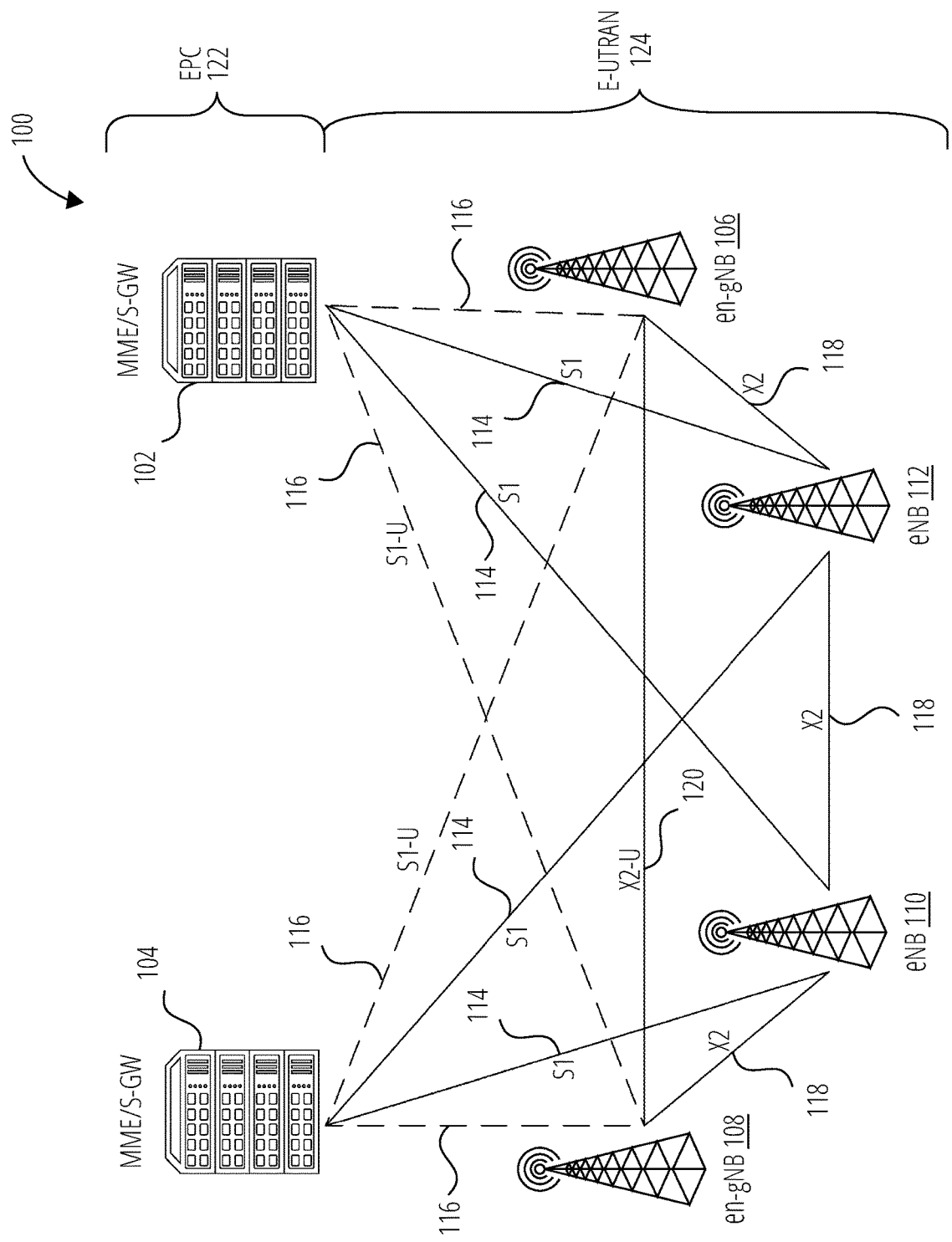
FIG. 1 illustrates an EN-DC architecture according to embodiments herein.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

A wireless network may configure a UE in a connected state to perform measurements and report the measurement results according to a measurement configuration. The measurement configuration may be provided by dedicated signaling. The measurement configuration may define, for example, measurement objects, reporting configurations, measurement gaps, and other parameters. For each measurement type (e.g., intra-frequency, inter-frequency, and inter-RAT), the measurement configuration may define one or more measurement object (MO). In NR, each MO may indicate frequency, timing, and subcarrier spacing of reference signals to be measured. An MO may be configured for synchronization signal blocks (SSB), channel state information reference signal (CSI-RS), or both.

A UE may use measurement gaps to perform measurements when it cannot measure a target carrier frequency while simultaneously transmitting/receiving on a serving cell. In LTE, the UE uses measurement gaps to perform inter-frequency and inter-RAT measurements. In NR, the need for measurement gaps may depend on the capability of the UE, the active bandwidth part (BWP) of the UE, and/or the current operating frequency. Measurements gaps might be required for intra-frequency, inter-frequency and inter-RAT measurements. Unlike LTE intra-frequency measurements, intra-frequency measurements in NR might require a measurement gap (MG) if, for example, the intra-frequency measurements are to be done outside of the active BWP.

During the measurement gaps, the measurements may be performed on SSBs of neighbor cells. The network provides the timing of neighbor cell SSBs using a Synchronization Signal (SS)/Physical Broadcast Channel (PBCH) Block Measurement Timing Configuration (SMTC). The MG and SMTC duration are configured such that the UE can identify and measure the SSBs within an SMTC window (i.e., the SMTC duration may be sufficient enough to accommodate the SSBs that are being transmitted).

Depending on the UE capability to support independent frequency range measurement and network preference, per- UE or per-FR measurement gaps are defined in NR. In per-FR MG, independent gap patterns (e.g., FR1 MG and FR2 MG) may be defined for FR1 and FR2. Per-UE MG applies to both FR1 (E-UTRA and NR) and FR2 (NR) frequencies.

Multi-Radio Dual Connectivity (MR-DC) is a generalization of Intra-E-UTRA Dual Connectivity (DC), where a multiple receive (Rx)/transmit (Tx) capable UE may be configured to utilize resources provided by two different nodes connected via non-ideal backhaul, one providing NR access and the other one providing either E-UTRA or NR access. One node may act as a Master Node (MN) and the other may act as a Secondary Node (SN). The MN and SN may be connected via a network interface, and at least the MN is connected to the core network. The MN and/or the SN may be operated with shared spectrum channel access.

One type of MR-DC deployment is E-UTRA-NR Dual Connectivity (EN-DC). For example, FIG. 1 illustrates an EN-DC architecture 100 according to embodiments herein. The EN-DC architecture 100 includes an E-UTRAN 124 and an EPC 122. The E-UTRAN 124 supports MR-DC via EN-DC, in which a UE is connected to one eNB that acts as a MN and one en-gNB that acts as a SN. An en-gNB may be a node that provides NR user plane and control plane protocol terminations towards the UE, and may act as an SN in EN-DC. In FIG. 1, the EPC 122 may comprise one or more Mobility Management Entity/Serving Gateways (MME/S-GWs), such as an MME/S-GW 104 and an MME/S-GW 102. By way of example, the E-UTRAN 124 may comprise an eNB 110, an eNB 112, an en-gNB 108, and an en-gNB 106. Each of the eNB 110 and the eNB 112 may be connected to the EPC 122 via one or more S1 interfaces 114 and to one or more en-gNBs via one or more X2 interfaces 118. Each of the en-gNB 108 and the en-gNB 106 may be connected to the EPC 122 via one or more S1-U interfaces 116. The en-gNB 108 and the en-gNB 106 may be connected to one another through an X2-U interface 120.

In an LTE MN with NR SN in an EN-DC deployment, both the LTE MN and the NR SN may configure one or more measurement object (MO) to the UE via, e.g., radio resource control (RRC) signaling. In EN-DC, only per-FR1 MG or per-UE MG may be configured from the LTE MN and only per-FR2 MG may be configured from the NR SN. Thus, certain operating scenarios may create uncertainties for whether inter-RAT measurements are to be performed within the MG or outside the MG.

Figure 2:
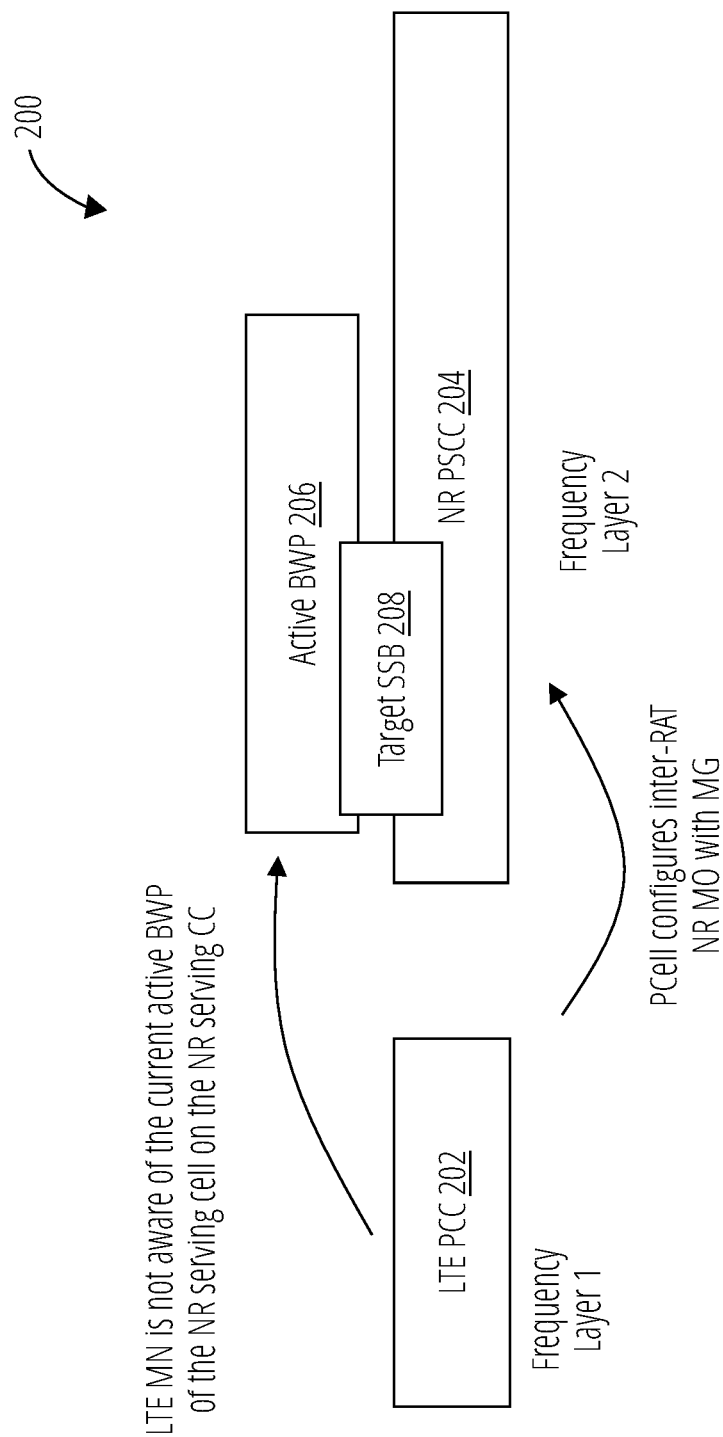
FIG. 2 illustrates a first example scenario with an LTE PCC in frequency layer 1 and an NR PSCC in frequency layer 2 according to embodiments herein.

In a first example scenario, an LTE MN configures inter-RAT MO on an NR serving component carrier (CC) (e.g., an NR primary secondary CC (PSCC) or secondary CC (SCC)) in FR1, or in FR2 when the UE has only per-UE MG capability. For example, FIG. 2 illustrates the first example scenario 200 with an LTE primary CC (PCC) (shown as LTE PCC 202) in frequency layer 1 and an NR PSCC 204 in frequency layer 2. In the illustrated example, the primary cell (PCell) (i.e., the LTE MN) configures inter-RAT NR MO with MG. However, the LTE MN is not aware of the current active BWP 206 of the NR serving cell on the NR serving CC (e.g., the NR PSCC 204 shown in FIG. 2). This may occur because, for example, the active BWP 206 is switched or configured more dynamically than the communication between an MN and an SN in MR-DC. Thus, even though the LTE MN knows the configured NR MO is on the serving CC, whether a target SSB 208 on the NR PSCC 204 is within the active BWP 206 or outside the active BWP 206 will determine if the MG is needed or not.

When the LTE MN configures the inter-RAT MO with MG, or always with MG, as shown in the example of FIG. 2, if the MG is partially overlapped with the SSB of the target MO, and the UE determines that the target SSBs are within the active BWP of its NR serving CC, the UE may be unable to determine whether to perform the inter-RAT measurement within MG or outside MG.

By way of example, FIG. 3A illustrates a fully overlapping case 300a and FIG. 3B illustrates a partially overlapping case 300b according to certain embodiments. In the fully overlapping case 300a, the SMTC duration/periodicity and the measurement gap repetition period (MGRP) are configured such that the SSBs of the target MO are located in the MG occasions.

In the partially overlapping case 300b, some of the SSBs of the target MO are located in the MG occasions and others are located outside the MG occasions. FIG. 3B shows an example where a periodicity of an SMTC (shown as 20 ms) is half the duration of the MGRP (shown as 40 ms) such that one SMTC out of two cannot be used to measure the SSBs of the target MO.

In other cases of the first example scenario, the LTE MN configures inter-RAT MO without MG. However, if the target SSB is not within the active BWP of the NR serving CC, the UE needs MG to perform the inter-RAT measurement. Without the MG being configured in such cases, the UE does not know how to perform the measurements.

In a second example scenario, the LTE MN configures inter-RAT MO on an NR non-serving CC (e.g., NR CCs other than NR PSCC or SCC) in FR1, or in FR2 when UE has only per-UE MG capability. However, the LTE MN is not aware of the current active BWP of the NR serving cell on any NR serving CC. Thus, even though the LTE MN knows the configured NR MO is on the non-serving CC, whether the target SSB is within the active BWP of one certain NR CC will determine if MG is needed or not. When the LTE MN configures inter-RAT MO on the non-serving NR CC with MG, or always with MG, if the MG is partially overlapped with the SSB of the target MO (e.g., MGRP=40 ms and SMTC of SSB=20 ms), and if the UE determines that the target SSBs are within the active BWP of one of its NR serving CCs, the UE may be unable to determine whether perform the inter-RAT measurement within MG or outside MG.

In a third example scenario, the LTE MN configures inter-RAT MO on an NR serving CC in FR2 and the UE supports per-FR MG. In such scenarios, the active BWP on NR serving cell is unclear or is not timely updated to the LTE MN. However, if the LTE MN configured this inter-RAT MO without MG, the SN can decide if FR2 MG is needed or not because the SN is aware of the active BWP.

In a fourth example scenario, the LTE MN configures inter-RAT MO on an NR non-serving CC in FR2 and the UE supports per-FR MG. In such scenarios, the active BWP on the NR serving cell is unclear or is not timely updated to the LTE MN. However, if the LTE MN configured this inter-RAT MO without MG, the SN can decide if FR2 MG is needed or not because the SN is aware of the active BWP.

Thus, certain embodiments herein provide solutions for the first and second example scenarios to perform inter-RAT measurements.

In certain embodiments for the first example scenario, a UE determines whether the LTE MN configures the one or more inter-RAT MO with or without MG. When the LTE MN configures the one or more inter-RAT MO on the NR serving CC with the MG, the UE performs an inter-RAT measurement on the NR serving CC based on whether the MG is fully overlapped or partially overlapped with SSBs of a target MO of the one or more inter-RAT MO. When the LTE MN configures the one or more inter-RAT MO on the NR serving CC without the MG, the UE performs the inter-RAT measurement on the NR serving CC based on whether a target SSB of the target MO is within or outside an active BWP of the NR serving CC.

As discussed above, in the first example scenario the LTE MN configures inter-RAT MO on a NR serving CC (e.g., NR PSCC or SCC) in FR1, or in FR2 when the UE has only per-UE MG capability. However, the LTE MN is not aware of the current active BWP of the NR serving cell on the NR serving CC (e.g., the active BWP is switched or configured more dynamically than the communication between MN and SN in MR-DC). In certain embodiments when the LTE MN configures inter-RAT MO with MG, or always with MG, if the MG is fully overlapped with the SSBs of the target MO (i.e., all the SSBs of the target MO are located in the MG occasions), the UE performs the inter-RAT measurement on this NR serving CC within the MG regardless of whether the active BWP can contain target SSB of this target MO or not.

In one embodiment of the first example scenario when the LTE MN configures inter-RAT MO with MG (or always with MG), if the MG is partially overlapped with the SSBs of the target MO (i.e., some of the SSBs of the target MO are located in the MG occasions and others are located outside the MG occasions), the UE performs the inter-RAT measurement on this NR serving CC within MG regardless of whether the active BWP can contain the target SSB of this target MO or not.

In another embodiment of the first example scenario when the LTE MN configures inter-RAT MO with MG (or always with MG, if the MG is partially overlapped with the SSBs of the target MO, the network (e.g., the LTE MN) sends an indication to the UE to either perform the inter-RAT measurement on this NR serving CC within MG or for the UE to determine whether or not to perform the inter-RAT measurement on this NR serving CC within MG. If the indication from the network is for the UE perform the inter-RAT measurement on this NR serving CC within MG, the UE performs the inter-RAT measurement on this NR serving CC within MG regardless of whether the active BWP can contain target SSB of this target MO or not. If, however, the indication from the network is for the UE to determine whether or not to perform the inter-RAT measurement on this NR serving CC within MG, the UE performs the inter-RAT measurement on this NR serving CC within MG if the target SSB of target MO is outside the active BWP of the serving CC, and the UE performs the inter-RAT measurement on this NR serving CC outside MG if the target SSB of target MO is inside the active BWP of the serving CC.

In another embodiment of the first example scenario when the LTE MN configures inter-RAT MO with MG (or always with MG), the UE performs the inter-RAT measurement on this NR serving CC within MG if the target SSB of target MO is outside the active BWP of the serving CC, and UE performs the inter-RAT measurement on this NR serving CC outside MG if the target SSB of target MO is inside the active BWP of the serving CC.

In certain embodiments of the first example scenario, the network avoids configuring the case where the MG is fully non-overlapped with the SSBs of the target MO (i.e., none of the SSBs of the target MO are located in the MG occasions).

In certain embodiments of the first example scenario, when the LTE MN configures the one or more inter-RAT MO on the NR serving CC without the MG, the UE performs the inter-RAT measurement on the NR serving CC based on whether a target SSB of the target MO is within or outside an active BWP of the NR serving CC. If the active BWP of the serving CC could contain the target SSB, the UE performs the inter-RAT measurement on this NR serving CC directly. If, however, the target SSB is outside the active BWP of the serving CC, the UE requests MG configuration from the LTE MN (PCell). For example, the UE may send RRC, media access control (MAC) layer, or physical (PHY) layer signaling or indication to the LTE PCell to ask for MG configuration. The signaling or indication from the UE may indicate the MO index to the LTE PCell that needs the MG configuration. After receiving the request from the UE, the network may configure the MG to the UE. Then, the UE may perform inter-RAT measurement using one of the embodiments discussed above for the first example scenario when the LTE MN configures inter-RAT MO with MG.

As discussed above, in the second example scenario the LTE MN configures inter-RAT MO on a NR non-serving CC (NR CCs other than NR PSCC or SCC) in FR1, or in FR2 when UE has only per-UE MG capability. However, the LTE MN is not aware of the current active BWP of the NR serving cell on any NR serving CC. In certain embodiments when the LTE MN configures inter-RAT MO on the non-serving NR CC with MG (or always with MG), if the MG is fully overlapped with the SSBs of the target MO (i.e., all the SSBs of the target MO are located in the MG occasions), the UE performs the inter-RAT measurement on this non-serving NR CC within MG regardless of whether the active BWP on one NR serving CC can contain target SSB of this target MO or not.

In one embodiment of the second example scenario when the LTE MN configures inter-RAT MO with MG (or always with MG), if the MG is partially overlapped with the SSBs of the target MO (i.e., some of the SSBs of the target MO are located in the MG occasions and others are located outside the MG occasions), the UE performs the inter-RAT measurement on the non-serving NR CC within MG regardless of whether the active BWP can contain target SSB of this target MO or not.

In another embodiment of the second example scenario when the LTE MN configures inter-RAT MO with MG (or always with MG), if the MG is partially overlapped with the SSBs of the target MO, the network (e.g., the LTE MN) sends an indication to the UE to either perform the inter-RAT measurement on the non-serving NR CC within MG or for the UE to determine whether or not to perform the inter-RAT measurement on the non-serving NR CC within MG. If the indication from the network is for the UE perform the inter-RAT measurement on the non-serving NR CC within MG, the UE performs the inter-RAT measurement on the non-serving NR CC within MG regardless of whether the active BWP on one NR serving CC can contain target SSB of this target MO or not. If, however, the indication from the network is for the UE to determine whether or not to perform the inter-RAT measurement on the non-serving NR CC within MG, the UE performs the inter-RAT measurement on the non-serving NR CC within MG if the target SSB of target MO is not within active BWP of any NR serving CC, and the UE performs the inter-RAT measurement on the non-serving NR CC outside MG if the target SSB of target MO is inside the active BWP of one NR serving CC.

In another embodiment of the second example scenario when the LTE MN configures inter-RAT MO with MG (or always with MG), the UE performs the inter-RAT measurement on the non-serving NR CC within MG if the target SSB of target MO is not within active BWP of any NR serving CC, and the UE performs the inter-RAT measurement on the non-serving NR CC outside MG if the target SSB of target MO is inside the active BWP of one NR serving CC.

In certain embodiments of the second example scenario, the network avoids configuring the case where the MG is fully non-overlapped with the SSBs of the target MO (i.e., none of the SSBs of the target MO are located in the MG occasions).

Figure 4:
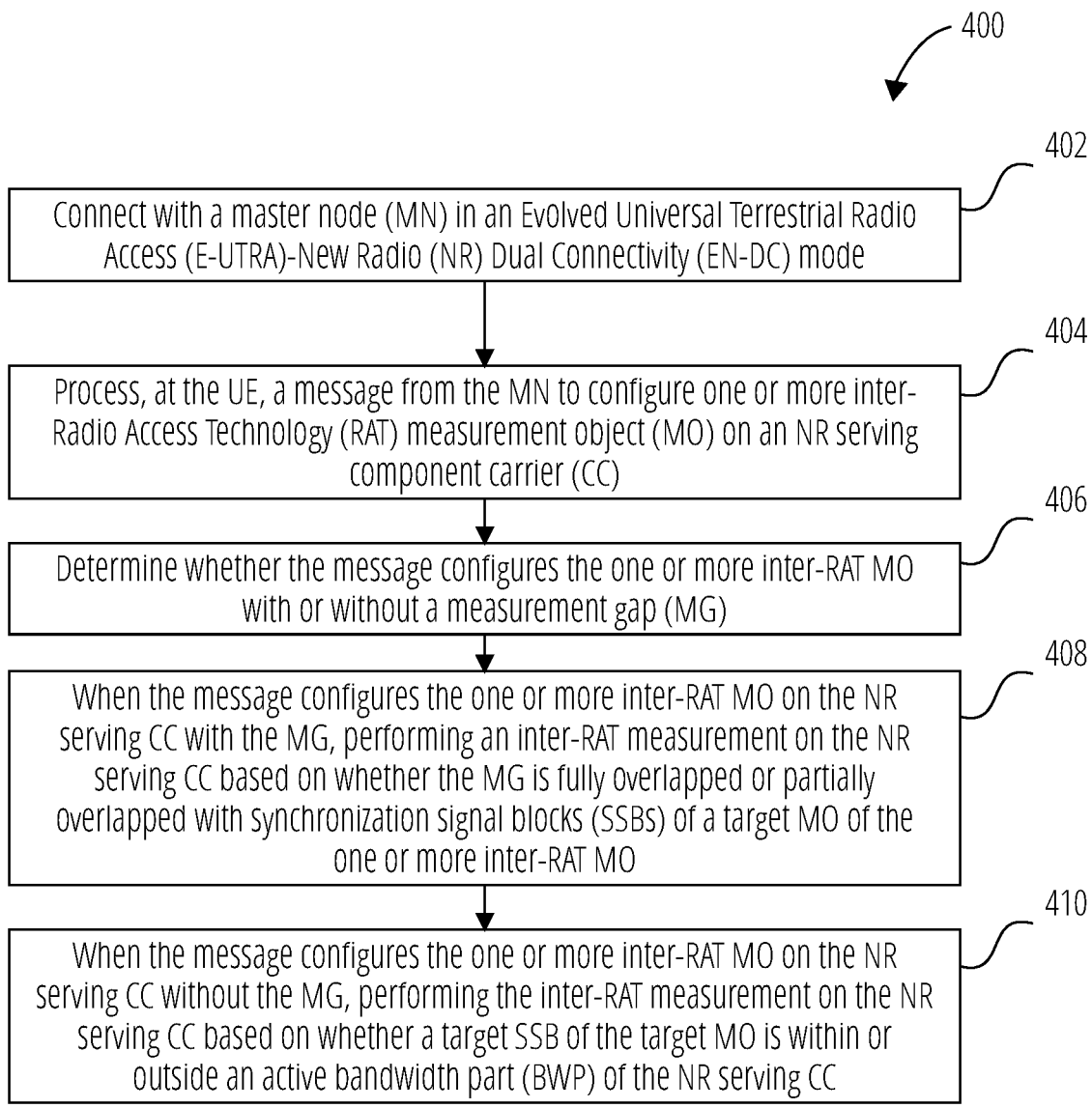
FIG. 4 is a flowchart of a method for a UE in accordance with one embodiment.

FIG. 4 is a flowchart of a method 400 for a UE according to one embodiment. The method 400 may be performed, for example, by a UE or components of a UE (e.g., one or more baseband processors) described herein. In block 402, the UE connects with a master node (MN) in an Evolved Universal Terrestrial Radio Access (E-UTRA)-New Radio (NR) Dual Connectivity (EN-DC) mode. In block 404, the UE processes a message from the MN to configure one or more inter-Radio Access Technology (RAT) measurement object (MO) on an NR serving component carrier (CC). In block 406, the UE determines whether the message configures the one or more inter-RAT MO with or without a measurement gap (MG). In block 408, when the message configures the one or more inter-RAT MO on the NR serving CC with the MG, the UE performs an inter-RAT measurement on the NR serving CC based on whether the MG is fully overlapped or partially overlapped with synchronization signal blocks (SSBs) of a target MO of the one or more inter-RAT MO. In block 410, when the message configures the one or more inter-RAT MO on the NR serving CC without the MG, the UE performs the inter-RAT measurement on the NR serving CC based on whether a target SSB of the target MO is within or outside an active bandwidth part (BWP) of the NR serving CC.

In one embodiment of the method 400, when the MG is fully overlapped with the SSBs of the target MO, the UE performs the inter-RAT measurement on the NR serving CC within the MG regardless of whether or not the active BWP contains the SSBs of the target MO.

In one embodiment of the method 400, when the MG is partially overlapped with the SSBs of the target MO, the UE performs the inter-RAT measurement on the NR serving CC within the MG regardless of whether or not the active BWP contains the target SSB of the target MO.

In one embodiment of the method 400, when the MG is partially overlapped with the SSBs of the target MO, the UE receives an indication from the MN for the UE to perform the inter-RAT measurement on the NR serving CC within the MG, and in response to the indication, the UE performs the inter-RAT measurement on the NR serving CC within the MG regardless of whether or not the active BWP contains the target SSB of the target MO.

In one embodiment of the method 400, when the MG is partially overlapped with the SSBs of the target MO, the UE receives an indication from the MN for the UE to determine whether to perform the inter-RAT measurement on the NR serving CC within the MG or outside the MG. In response to the indication, the UE performs the inter-RAT measurement on the NR serving CC within the MG when the target SSB of the target MO is outside the active BWP of the NR serving CC, and performs the inter-RAT measurement on the NR serving CC outside the MG when the target SSB of the target MO is inside the active BWP of the NR serving CC.

In one embodiment of the method 400, when the MG is partially overlapped with the SSBs of the target MO, the UE performs the inter-RAT measurement on the NR serving CC within the MG when the target SSB of the target MO is outside the active BWP of the NR serving CC, and the UE performs the inter-RAT measurement on the NR serving CC outside the MG when the target SSB of the target MO is inside the active BWP of the NR serving CC.

In one embodiment of the method 400, when the message configures the one or more inter-RAT MO on the NR serving CC without the MG, and when the target SSB is within the active BWP of the NR serving CC, the UE directly performs the inter-RAT measurement on the NR serving CC.

In one embodiment of the method 400, when the message configures the one or more inter-RAT MO on the NR serving CC without the MG, and when the target SSB is outside the active BWP of the NR serving CC, the UE sends an indication to an E-UTRA primary cell (PCell) to request an MG configuration, the indication comprising an MO index corresponding to the target MO to configure with the MG.

Figure 5:
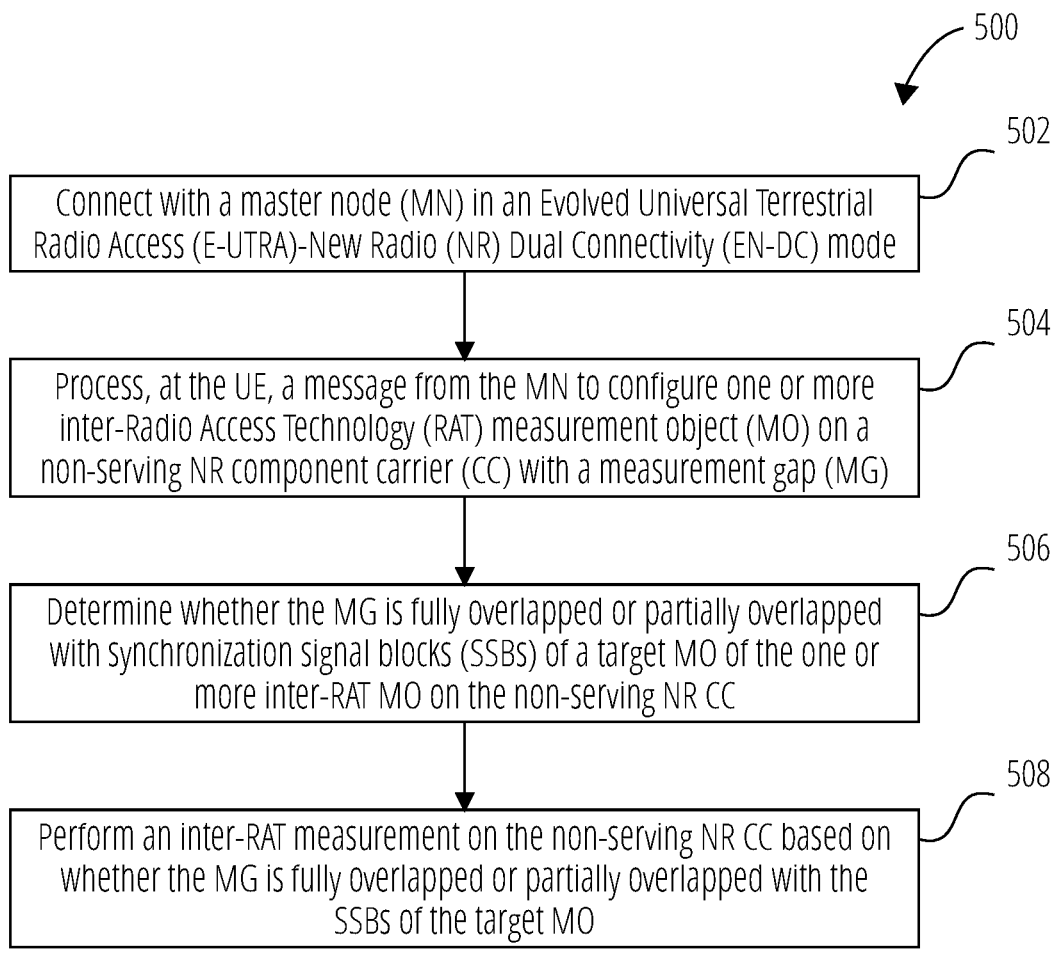
FIG. 5 is a flowchart of a method for a UE in accordance with one embodiment.

FIG. 5 is a flowchart of a method 500 for a UE according to one embodiment. The method 500 may be performed, for example, by a UE or components of a UE (e.g., one or more baseband processors) described herein. In block 502, the UE connects with a master node (MN) in an Evolved Universal Terrestrial Radio Access (E-UTRA)-New Radio (NR) Dual Connectivity (EN-DC) mode. In block 504, the UE processes a message from the MN to configure one or more inter-Radio Access Technology (RAT) measurement object (MO) on a non-serving NR component carrier (CC) with a measurement gap (MG). In block 506, the UE determines whether the MG is fully overlapped or partially overlapped with synchronization signal blocks (SSBs) of a target MO of the one or more inter-RAT MO on the non-serving NR CC. In block 508, the UE performs an inter-RAT measurement on the non-serving NR CC based on whether the MG is fully overlapped or partially overlapped with the SSBs of the target MO.

In one embodiment of the method 500, when the MG is fully overlapped with the SSBs of the target MO, the UE performs the inter-RAT measurement on the non-serving NR CC within the MG regardless of whether or not an active bandwidth part (BWP) on one NR serving CC contains the SSBs of the target MO.

In one embodiment of the method 500, when the MG is partially overlapped with the SSBs of the target MO, the UE performs the inter-RAT measurement on the non-serving NR CC within the MG regardless of whether or not an active bandwidth part (BWP) contains a target SSB of the target MO.

In one embodiment of the method 500, when the MG is partially overlapped with the SSBs of the target MO, the UE receives an indication from the MN for the UE to perform the inter-RAT measurement on the non-serving NR CC within the MG. In response to the indication, the UE performs the inter-RAT measurement on the non-serving NR CC within the MG regardless of whether or not an active bandwidth part (BWP) on one NR serving CC contains a target SSB of the target MO.

In one embodiment of the method 500, when the MG is partially overlapped with the SSBs of the target MO, the UE receives an indication from the MN for the UE to determine whether to perform the inter-RAT measurement on the non-serving NR CC within the MG or outside the MG. In response to the indication, the UE performs the inter-RAT measurement on the non-serving NR CC within the MG when a target SSB of the target MO is not within an active bandwidth part (BWP) of any NR serving CC, and the UE performs the inter-RAT measurement on the non-serving NR CC outside the MG when the target SSB of the target MO is inside the active BWP of one NR serving CC.

In one embodiment of the method 500, when the MG is partially overlapped with the SSBs of the target MO, the UE performs the inter-RAT measurement on the non-serving NR CC within the MG when a target SSB of the target MO is outside an active bandwidth part (BWP) of the non-serving NR CC, and the UE performs the inter-RAT measurement on the non-serving NR CC outside the MG when the target SSB of the target MO is inside the active BWP of the non-serving NR CC.

Figure 6:
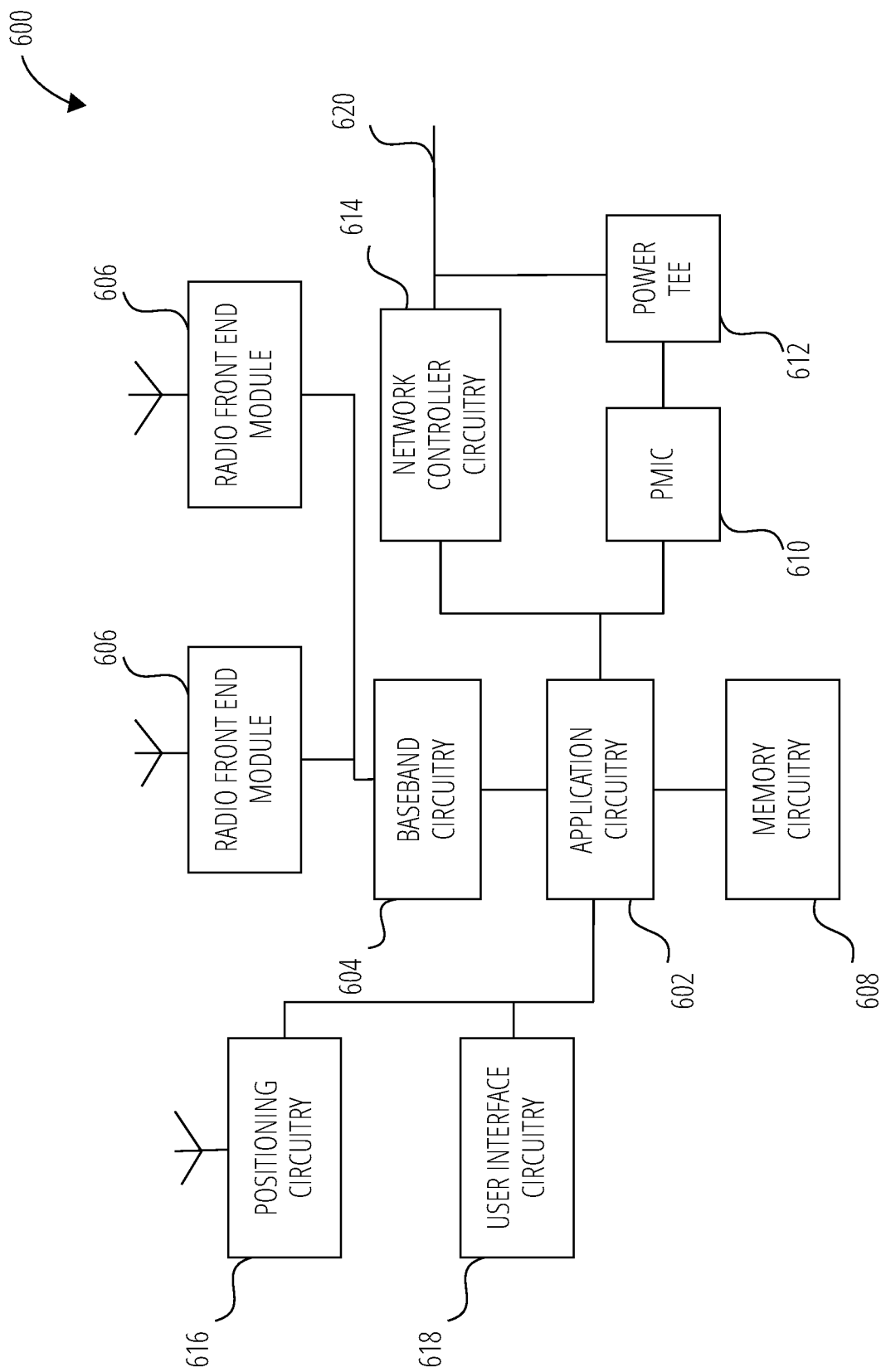
FIG. 6 illustrates an infrastructure equipment in accordance with one embodiment.

FIG. 6 illustrates an example of infrastructure equipment 600 in accordance with various embodiments. The infrastructure equipment 600 may be implemented as a base station, radio head, RAN node, AN, application server, and/or any other element/device discussed herein. In other examples, the infrastructure equipment 600 could be implemented in or by a UE.

The infrastructure equipment 600 includes application circuitry 602, baseband circuitry 604, one or more radio front end module 606 (RFEM), memory circuitry 608, power management integrated circuitry (shown as PMIC 610), power tee circuitry 612, network controller circuitry 614, network interface connector 620, satellite positioning circuitry 616, and user interface circuitry 618. In some embodiments, the device infrastructure equipment 600 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 602 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 602 may be coupled with or may include memory/storage elements and may be configured to execute instructions stored in the memory/storage to enable various applications or operating systems to run on the infrastructure equipment 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 602 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 602 may comprise, or may be, a special-purpose processor/controller to operate according to the various embodiments herein. As examples, the processor(s) of application circuitry 602 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 600 may not utilize application circuitry 602, and instead may include a special-purpose processor/controller to process IP data received from an EPC or 5GC, for example.

In some implementations, the application circuitry 602 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 602 may comprise logic blocks or logic fabric, and other interconnected resources that may be programmed to perform various functions, such as the procedures, methods, functions, etc. of the various embodiments discussed herein. In such embodiments, the circuitry of application circuitry 602 may include memory cells (e.g., erasable programmable read-only memory (EPROM), electrically erasable programmable read-only memory (EEPROM), flash memory, static memory (e.g., static random access memory(SRAM), anti-fuses, etc.)) used to store logic blocks, logic fabric, data, etc. in look-up-tables (LUTs) and the like. The baseband circuitry 604 may be implemented, for example, as a solder-down substrate including one or more integrated circuits, a single packaged integrated circuit soldered to a main circuit board or a multi-chip module containing two or more integrated circuits.

The user interface circuitry 618 may include one or more user interfaces designed to enable user interaction with the infrastructure equipment 600 or peripheral component interfaces designed to enable peripheral component interaction with the infrastructure equipment 600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 606 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 606, which incorporates both mmWave antennas and sub-mmWave.

The memory circuitry 608 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory(MRAM), etc., and may incorporate the three-dimensional (3D)cross-point (XPOINT) memories from Intel® and Micron®. The memory circuitry 608 may be implemented as one or more of solder down packaged integrated circuits, socketed memory modules and plug-in memory cards.

The PMIC 610 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 612 may provide for electrical power drawn from a network cable to provide both power supply and data connectivity to the infrastructure equipment 600 using a single cable.

The network controller circuitry 614 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 via network interface connector 620 using a physical connection, which may be electrical (commonly referred to as a "copper interconnect"), optical, or wireless. The network controller circuitry 614 may include one or more dedicated processors and/or FPGAs to communicate using one or more of the aforementioned protocols. In some implementations, the network controller circuitry 614 may include multiple controllers to provide connectivity to other networks using the same or different protocols.

The positioning circuitry 616 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 616 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 616 may include a Micro-Technology for Positioning, Navigation, and Timing (Micro-PNT) IC that uses a master timing clock to perform position tracking/estimation without GNSS assistance. The positioning circuitry 616 may also be part of, or interact with, the baseband circuitry 604 and/or radio front end module 606 to communicate with the nodes and components of the positioning network. The positioning circuitry 616 may also provide position data and/or time data to the application circuitry 602, which may use the data to synchronize operations with various infrastructure, or the like. The components shown by FIG. 6 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 7:
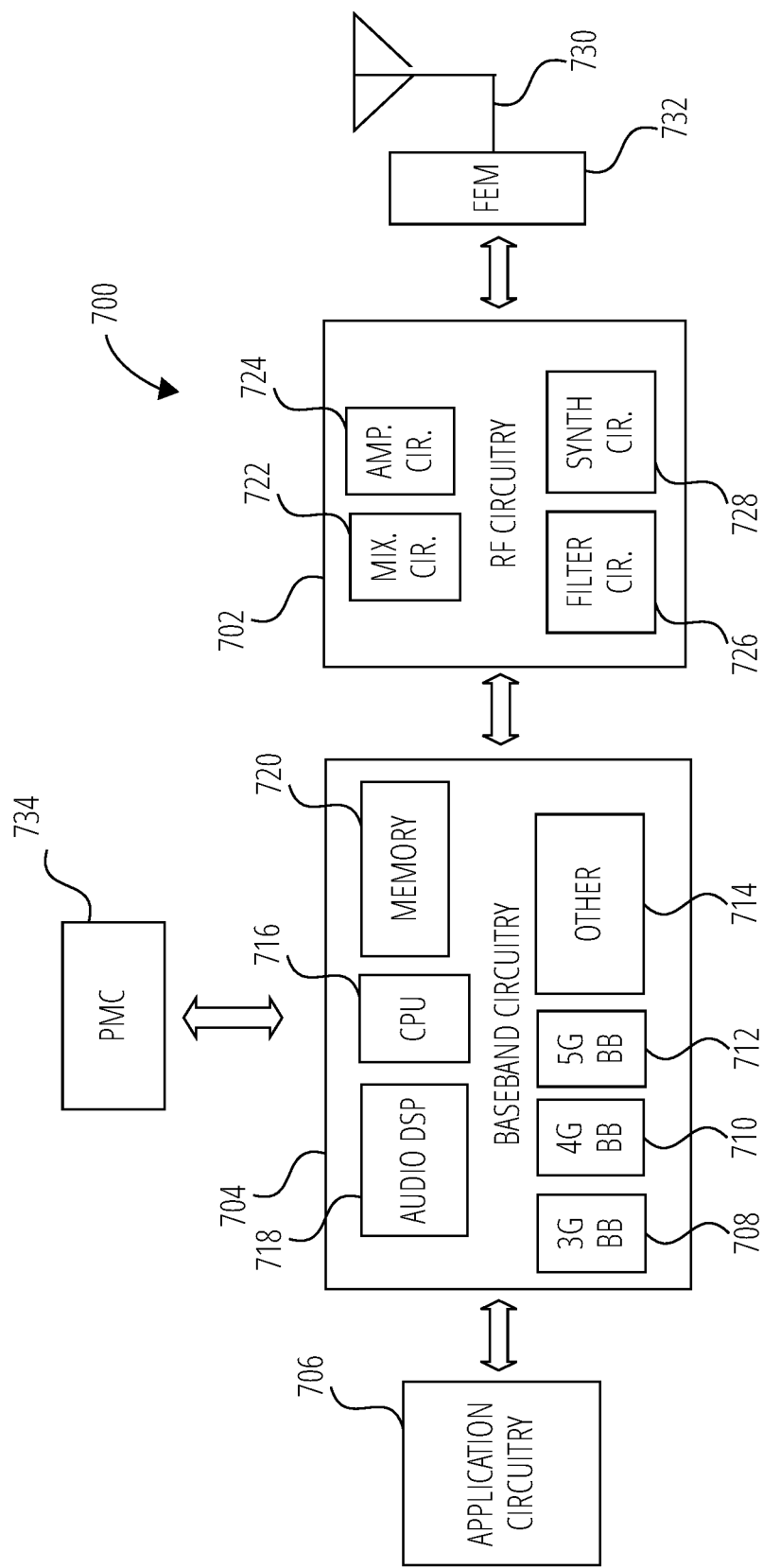
FIG. 7 illustrates a device in accordance with one embodiment.

FIG. 7 illustrates example components of a device 700 in accordance with some embodiments. In some embodiments, the device 700 may include application circuitry 706, baseband circuitry 704, Radio Frequency (RF) circuitry (shown as RF circuitry 702), front-end module (FEM) circuitry (shown as FEM circuitry 732), one or more antennas 730, and power management circuitry (PMC) (shown as PMC 734) coupled together at least as shown. The components of the illustrated device 700 may be included in a UE or a RAN node. In some embodiments, the device 700 may include fewer elements (e.g., a RAN node may not utilize application circuitry 706, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 706 may include one or more application processors. For example, the application circuitry 706 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 706 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 702 and to generate baseband signals for a transmit signal path of the RF circuitry 702. The baseband circuitry 704 may interface with the application circuitry 706 for generation and processing of the baseband signals and for controlling operations of the RF circuitry 702. For example, in some embodiments, the baseband circuitry 704 may include a third generation (3G) baseband processor (3G baseband processor 708), a fourth generation (4G) baseband processor (4G baseband processor 710), a fifth generation (5G) baseband processor (5G baseband processor 712), or other baseband processor(s) 714 for other existing generations, generations in development or to be developed in the future (e.g., second generation (2G), sixth generation (6G), etc.). The baseband circuitry 704 (e.g., one or more of baseband processors) may handle various radio control functions that enable communication with one or more radio networks via the RF circuitry 702. In other embodiments, some or all of the functionality of the illustrated baseband processors may be included in modules stored in the memory 720 and executed via a Central Processing Unit (CPU 716). The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include a digital signal processor (DSP), such as one or more audio DSP(s) 718. The one or more audio DSP(s) 718 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 706 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 704 is configured to support radio communications of more than one wireless protocol may be referred to as multi-mode baseband circuitry.

The RF circuitry 702 may enable communication with wireless networks using modulated electromagnetic radiation through a non-solid medium. In various embodiments, the RF circuitry 702 may include switches, filters, amplifiers, etc. to facilitate the communication with the wireless network. The RF circuitry 702 may include a receive signal path which may include circuitry to down-convert RF signals received from the FEM circuitry 732 and provide baseband signals to the baseband circuitry 704. The RF circuitry 702 may also include a transmit signal path which may include circuitry to up-convert baseband signals provided by the baseband circuitry 704 and provide RF output signals to the FEM circuitry 732 for transmission.

In some embodiments, the receive signal path of the RF circuitry 702 may include mixer circuitry 722, amplifier circuitry 724 and filter circuitry 726. In some embodiments, the transmit signal path of the RF circuitry 702 may include filter circuitry 726 and mixer circuitry 722. The RF circuitry 702 may also include synthesizer circuitry 728 for synthesizing a frequency for use by the mixer circuitry 722 of the receive signal path and the transmit signal path. In some embodiments, the mixer circuitry 722 of the receive signal path may be configured to down-convert RF signals received from the FEM circuitry 732 based on the synthesized frequency provided by synthesizer circuitry 728. The amplifier circuitry 724 may be configured to amplify the down-converted signals and the filter circuitry 726 may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, the mixer circuitry 722 of the receive signal path may comprise passive mixers, although the scope of the embodiments is not limited in this respect.

In some embodiments, the mixer circuitry 722 of the transmit signal path may be configured to up-convert input baseband signals based on the synthesized frequency provided by the synthesizer circuitry 728 to generate RF output signals for the FEM circuitry 732. The baseband signals may be provided by the baseband circuitry 704 and may be filtered by the filter circuitry 726.

In some embodiments, the mixer circuitry 722 of the receive signal path and the mixer circuitry 722 of the transmit signal path may include two or more mixers and may be arranged for quadrature downconversion and upconversion, respectively. In some embodiments, the mixer circuitry 722 of the receive signal path and the mixer circuitry 722 of the transmit signal path may include two or more mixers and may be arranged for image rejection (e.g., Hartley image rejection). In some embodiments, the mixer circuitry 722 of the receive signal path and the mixer circuitry 722 may be arranged for direct downconversion and direct upconversion, respectively. In some embodiments, the mixer circuitry 722 of the receive signal path and the mixer circuitry 722 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 702 may include analog-to-digital converter (ADC) and digital-to-analog converter (DAC) circuitry and the baseband circuitry 704 may include a digital baseband interface to communicate with the RF circuitry 702.

In some dual-mode embodiments, a separate radio IC circuitry may be provided for processing signals for each spectrum, although the scope of the embodiments is not limited in this respect.

In some embodiments, the synthesizer circuitry 728 may be a fractional-N synthesizer or a fractional N/N+1 synthesizer, although the scope of the embodiments is not limited in this respect as other types of frequency synthesizers may be suitable. For example, synthesizer circuitry 728 may be a delta-sigma synthesizer, a frequency multiplier, or a synthesizer comprising a phase-locked loop with a frequency divider.

The synthesizer circuitry 728 may be configured to synthesize an output frequency for use by the mixer circuitry 722 of the RF circuitry 702 based on a frequency input and a divider control input. In some embodiments, the synthesizer circuitry 728 may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 706 (such as an applications processor) depending on the desired output frequency. In some embodiments, a divider control input (e.g., N) may be determined from a look-up table based on a channel indicated by the application circuitry 706.

Synthesizer circuitry 728 of the RF circuitry 702 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 728 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 702 may include an IQ/polar converter.

The FEM circuitry 732 may include a receive signal path which may include circuitry configured to operate on RF signals received from one or more antennas 730, amplify the received signals and provide the amplified versions of the received signals to the RF circuitry 702 for further processing. The FEM circuitry 732 may also include a transmit signal path which may include circuitry configured to amplify signals for transmission provided by the RF circuitry 702 for transmission by one or more of the one or more antennas 730. In various embodiments, the amplification through the transmit or receive signal paths may be done solely in the RF circuitry 702, solely in the FEM circuitry 732, or in both the RF circuitry 702 and the FEM circuitry 732.

In some embodiments, the FEM circuitry 732 may include a TX/RX switch to switch between transmit mode and receive mode operation. The FEM circuitry 732 may include a receive signal path and a transmit signal path. The receive signal path of the FEM circuitry 732 may include an LNA to amplify received RF signals and provide the amplified received RF signals as an output (e.g., to the RF circuitry 702). The transmit signal path of the FEM circuitry 732 may include a power amplifier (PA) to amplify input RF signals (e.g., provided by the RF circuitry 702), and one or more filters to generate RF signals for subsequent transmission (e.g., by one or more of the one or more antennas 730).

In some embodiments, the PMC 734 may manage power provided to the baseband circuitry 704. In particular, the PMC 734 may control power-source selection, voltage scaling, battery charging, or DC-to-DC conversion. The PMC 734 may often be included when the device 700 is capable of being powered by a battery, for example, when the device 700 is included in a UE. The PMC 734 may increase the power conversion efficiency while providing desirable implementation size and heat dissipation characteristics.

FIG. 7 shows the PMC 734 coupled only with the baseband circuitry 704. However, in other embodiments, the PMC 734 may be additionally or alternatively coupled with, and perform similar power management operations for, other components such as, but not limited to, the application circuitry 706, the RF circuitry 702, or the FEM circuitry 732.

In some embodiments, the PMC 734 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 706 and processors of the baseband circuitry 704 may be used to execute elements of one or more instances of a protocol stack. For example, processors of the baseband circuitry 704, alone or in combination, may be used to execute Layer 3, Layer 2, or Layer 1 functionality, while processors of the application circuitry 706 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
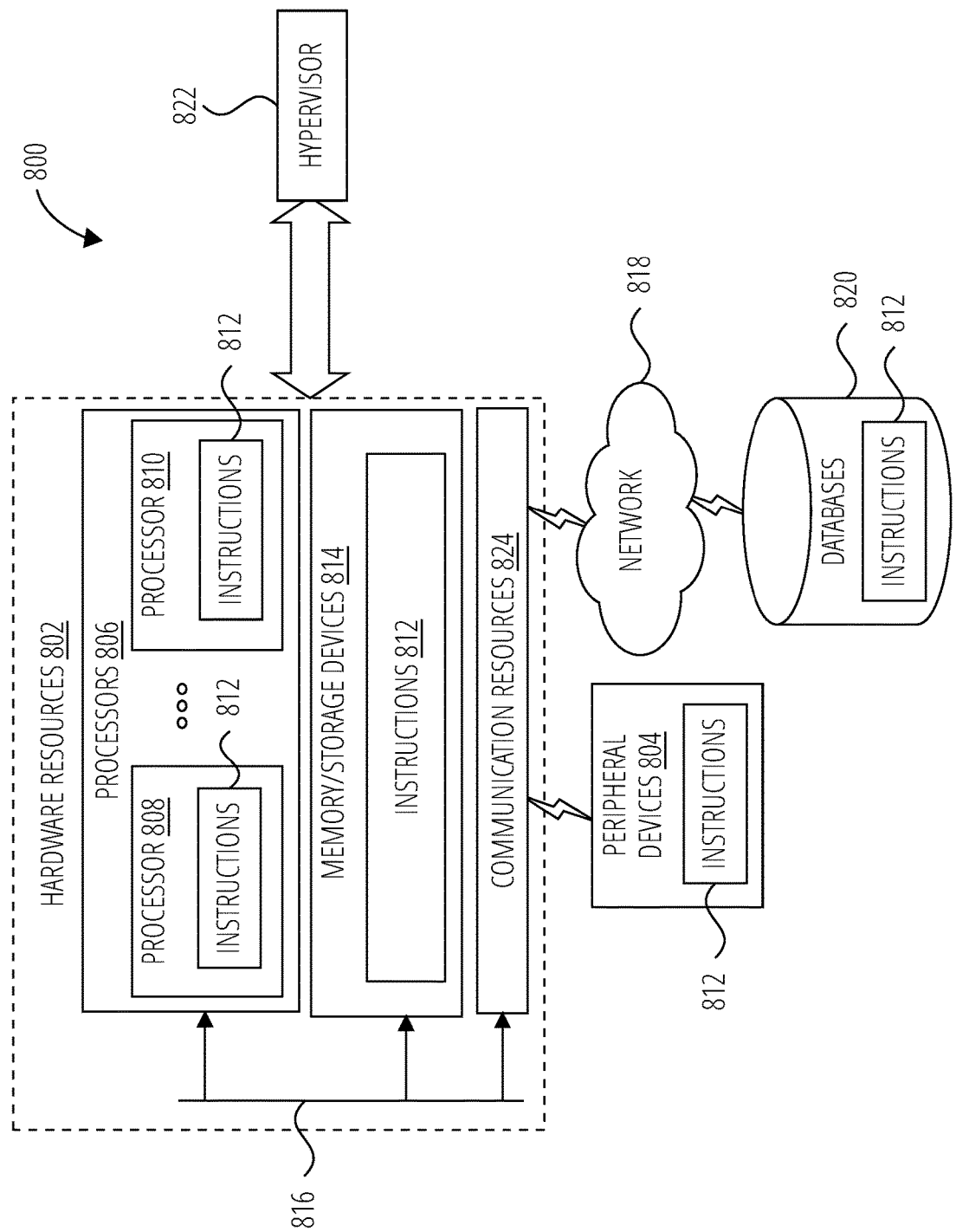
FIG. 8 illustrates components in accordance with one embodiment.

FIG. 8 is a block diagram illustrating components 800, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 802 including one or more processors 806 (or processor cores), one or more memory/storage devices 814, and one or more communication resources 824, each of which may be communicatively coupled via a bus 816. For embodiments where node virtualization (e.g., NFV) is utilized, a hypervisor 822 may be executed to provide an execution environment for one or more network slices/sub-slices to utilize the hardware resources 802.

The processors 806 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 808 and a processor 810.

The memory/storage devices 814 may include main memory, disk storage, or any suitable combination thereof. The memory/storage devices 814 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 824 may include interconnection or network interface components or other suitable devices to communicate with one or more peripheral devices 804 or one or more databases 820 via a network 818. For example, the communication resources 824 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 812 may comprise software, a program, an application, an applet, an app, or other executable code for causing at least any of the processors 806 to perform any one or more of the methodologies discussed herein. The instructions 812 may reside, completely or partially, within at least one of the processors 806 (e.g., within the processor's cache memory), the memory/storage devices 814, or any suitable combination thereof. Furthermore, any portion of the instructions 812 may be transferred to the hardware resources 802 from any combination of the peripheral devices 804 or the databases 820. Accordingly, the memory of the processors 806, the memory/storage devices 814, the peripheral devices 804, and the databases 820 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 may include an apparatus comprising means to perform one or more elements of a method described in or related to any of the above embodiments, or any other method or process described herein.

Example 2 may include one or more non-transitory computer-readable media comprising instructions to cause an electronic device, upon execution of the instructions by one or more processors of the electronic device, to perform one or more elements of a method described in or related to any of the above embodiments, or any other method or process described herein.

Example 3 may include an apparatus comprising logic, modules, or circuitry to perform one or more elements of a method described in or related to any of the above embodiments, or any other method or process described herein.

Example 4 may include a method, technique, or process as described in or related to any of the above embodiments, or portions or parts thereof.

Example 5 may include an apparatus comprising: one or more processors and one or more computer-readable media comprising instructions that, when executed by the one or more processors, cause the one or more processors to perform the method, techniques, or process as described in or related to any of the above embodiments, or portions thereof.

Example 6 may include a signal as described in or related to any of the above embodiments, or portions or parts thereof.

Example 7 may include a datagram, packet, frame, segment, protocol data unit (PDU), or message as described in or related to any of the above embodiments, or portions or parts thereof, or otherwise described in the present disclosure.

Example 8 may include a signal encoded with data as described in or related to any of the above embodiments, or portions or parts thereof, or otherwise described in the present disclosure.

Example 9 may include a signal encoded with a datagram, packet, frame, segment, PDU, or message as described in or related to any of the above embodiments, or portions or parts thereof, or otherwise described in the present disclosure.

Example 10 may include an electromagnetic signal carrying computer-readable instructions, wherein execution of the computer-readable instructions by one or more processors is to cause the one or more processors to perform the method, techniques, or process as described in or related to any of the above embodiments, or portions thereof.

Example 11 may include a computer program comprising instructions, wherein execution of the program by a processing element is to cause the processing element to carry out the method, techniques, or process as described in or related to any of the above embodiments, or portions thereof.

Example 12 may include a signal in a wireless network as shown and described herein.

Example 13 may include a method of communicating in a wireless network as shown and described herein.

Example 14 may include a system for providing wireless communication as shown and described herein.

Example 15 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A non-transitory computer-readable storage medium including instructions that, when executed by a processor of a network device, cause the processor to:
   process a request, from a user equipment (UE), to configure a measurement gap (MG); and
   in response to the request, configure the UE with one or more inter-Radio Access Technology (RAT) measurement object (MO) on a non-serving NR component carrier (CC) with the MG,
   wherein the MG is fully overlapped or partially overlapped with synchronization signal blocks (SSBs) of a target MO of the one or more inter-RAT MO on the non-serving NR CC, wherein when the MG is partially overlapped with the SSBs of the target MO, the instructions further cause the processor to send an indication to the UE, and wherein the indication instructs the UE to determine whether to perform the inter-RAT measurement on the non-serving NR CC within the MG or outside the MG.

2. The non-transitory computer-readable storage medium of claim 1, wherein the request includes an MO index corresponding to the inter-RAT MO for which the MG is requested.

3. The non-transitory computer-readable storage medium of claim 1, wherein the instructions further cause the processor to avoid configuring the UE with the MG when the MG is fully non-overlapped with the SSBs of the target MO.

4. An apparatus of a network device, comprising:
   a memory to store a request, from a user equipment (UE), to configure a measurement gap (MG); and
   one or more processors configured to, in response to the request, configure the UE with one or more inter-Radio Access Technology (RAT) measurement object (MO) on a non-serving NR component carrier (CC) with the MG,
   wherein the MG is fully overlapped or partially overlapped with synchronization signal blocks (SSBs) of a target MO of the one or more inter-RAT MO on the non-serving NR CC, wherein when the MG is partially overlapped with the SSBs of the target MO, the one or more processors are further configured to send an indication to the UE, and wherein the indication instructs the UE to determine whether to perform the inter-RAT measurement on the non-serving NR CC within the MG or outside the MG.

5. The apparatus of claim 4, wherein the request includes an MO index corresponding to the inter-RAT MO for which the MG is requested.

6. The apparatus of claim 4, wherein the one or more processors are further configured to avoid configuring the UE with the MG when the MG is fully non-overlapped with the SSBs of the target MO.

7. A method for a network device, the method comprising:
   processing a request, from a user equipment (UE), to configure a measurement gap MG); and
   in response to the request, configuring the UE with one or more inter-Radio Access Technology (RAT) measurement object (MO) on a non-serving NR component carrier (CC) with the MG,
   wherein the MG is fully overlapped or partially overlapped with synchronization signal blocks (SSBs) of a target MO of the one or more inter-RAT MO on the non-serving NR CC, wherein when the MG is partially overlapped with the SSBs of the target MO, the method further comprises sending an indication to the UE, and wherein the indication instructs the UE to determine whether to perform the inter-RAT measurement on the non-serving NR CC within the MG or outside the MG.

8. The method of claim 7, wherein the request includes an MO index corresponding to the inter-RAT MO for which the MG is requested.

9. The method of claim 7, further comprising avoiding configuring the UE with the MG when the MG is fully non-overlapped with the SSBs of the target MO.

* * * * *